(12) United States Patent
De Brouwer et al.

(10) Patent No.: US 10,623,858 B2
(45) Date of Patent: Apr. 14, 2020

(54) AUDIO STREAM NETWORK WITH NETWORK COMPONENTS AND METHOD FOR RUNNING AND/OR CONFIGURING THE NETWORK WITH NETWORK COMPONENTS

(71) Applicant: Robert Bosch GmbH, Stuttgart (DE)

(72) Inventors: Tom De Brouwer, Breda (NL); Marc Smaak, Bergen op Zoom (NL); Stephan Van Tienen, Bergen op Zoom (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/915,103

(22) Filed: Mar. 8, 2018

(65) Prior Publication Data

US 2018/0262835 A1 Sep. 13, 2018

(30) Foreign Application Priority Data

Mar. 8, 2017 (EP) ..................... 17159802

(51) Int. Cl.
*H04R 3/12* (2006.01)
*H04L 12/28* (2006.01)
*H04L 29/06* (2006.01)
*H04L 12/413* (2006.01)
*H04L 12/18* (2006.01)
(Continued)

(52) U.S. Cl.
CPC ............... *H04R 3/12* (2013.01); *H04L 12/18* (2013.01); *H04L 12/2805* (2013.01); *H04L 12/413* (2013.01); *H04L 65/4076* (2013.01); *H04L 2012/2849* (2013.01); *H04N 21/43615* (2013.01); *H04N 21/8113* (2013.01); *H04R 2227/005* (2013.01); *H04R 2420/07* (2013.01)

(58) Field of Classification Search
CPC ................ H04R 3/12; H04R 2227/005; H04R 2420/07; H04L 12/18; H04L 12/2805; H04L 12/413; H04L 65/4076; H04L 2012/2849; H04N 21/43615
See application file for complete search history.

(56) References Cited

U.S. PATENT DOCUMENTS 9,338,221 B2 * 5/2016 Petit-Huguenin ........................... H04L 12/1827
9,398,263 B2 * 7/2016 Field ..................... H04L 12/185
(Continued)

FOREIGN PATENT DOCUMENTS

EP 2939384 A1 11/2015
WO 2016126303 A1 8/2016

*Primary Examiner* — Mohammad K Islam
(74) *Attorney, Agent, or Firm* — Michael Best & Friedrich LLP

(57) ABSTRACT

Streaming of high bandwidth audio streams using the Internet Protocol on an Ethernet network is common practice. The invention concerns an audio stream network 1 with network components, wherein the network components comprise at least one source device 2 and a plurality of receiving devices 3, 3a, 3b, 3c,
wherein the network components are connected with a network connection, wherein the network connection is using the internet protocol, wherein the source device 2 is adapted to provide an audio stream 4a, 4b, 4c, wherein the audio stream 4a, 4b, 4c comprises at least one channel, wherein the receiving devices 3, 3a, 3b,3c are adapted to receive one or more audio stream 4a, 4b, 4c from at least one of the source devices 3, 3a, 3b, 3c.

18 Claims, 2 Drawing Sheets

(51) Int. Cl.
*H04N 21/81* (2011.01)
*H04N 21/436* (2011.01)

(56) References Cited

U.S. PATENT DOCUMENTS

| | | | |
|---|---|---|---|
| 9,402,107 B2* | 7/2016 | Gonder | H04L 65/605 |
| 9,674,251 B2* | 6/2017 | Wang | H04L 65/60 |
| 2005/0195823 A1* | 9/2005 | Chen | H04L 12/185 |
| | | | 370/395.1 |
| 2011/0069652 A1 | 3/2011 | Kakani et al. | |
| 2013/0123019 A1* | 5/2013 | Sullivan | A63F 13/424 |
| | | | 463/42 |
| 2013/0246631 A1 | 9/2013 | Gonzales et al. | |
| 2013/0290428 A1* | 10/2013 | Petit-Huguenin | |
| | | | H04L 12/1827 |
| | | | 709/204 |
| 2014/0098713 A1 | 4/2014 | Beckhardt et al. | |
| 2014/0282777 A1* | 9/2014 | Gonder | H04L 65/605 |
| | | | 725/109 |
| 2014/0372624 A1* | 12/2014 | Wang | H04L 65/60 |
| | | | 709/231 |
| 2016/0164935 A1* | 6/2016 | Chen | H04L 1/1877 |
| | | | 709/219 |
| 2017/0078371 A1* | 3/2017 | Kodaypak | H04L 67/101 |
| 2018/0077443 A1* | 3/2018 | Lau | H04N 5/04 |

\* cited by examiner

AUDIO STREAM NETWORK WITH NETWORK COMPONENTS AND METHOD FOR RUNNING AND/OR CONFIGURING THE NETWORK WITH NETWORK COMPONENTS

BACKGROUND OF THE INVENTION

The invention relates to an audio stream network with network components, wherein the network components comprise at least one source device and a plurality of receiving devices, wherein the network components are connected with a network connection, wherein the network connection is using the internet protocol, wherein the source device is adapted to provide an audio stream, wherein the receiving devices are adapted to receive one or more audio streams from at least one of the source devices.

Streaming of high bandwidth audio streams using the internet protocol on an Ethernet network is common practice. Such streams originate at a source and ends up at a sink. Such streams often carry multiple audio channels in order to be efficient.

The document EP 29 39 384 A1, which seems to be the closest state of the art, discloses an audio stream arrangement comprising a plurality of audio devices, whereby each audio device is adapted to provide an audio stream and whereby each audio device comprises an audio device network interface for transmitting its audio stream over a network, a control device, whereby the control device is adapted to send a command over the network to any of the audio devices to set the audio device in an active state, whereby the audio devices in the active state transmits its audio stream over the network, a processing device for processing the audio stream from the active audio device, whereby the processing device comprises a processing device network interface for receiving the audio stream from the network and mixing unit with a plurality of input channels and output channels, whereby each input channel can be assigned to an audio stream from one active audio device and whereby the mixing unit is operable to mix the audio stream from the plurality of input channels into a common audio stream and to output the common audio stream to the output channel, wherein the audio stream from the active audio device to the processing device are transmitted by a multicast transmission.

SUMMARY OF THE INVENTION

According to the invention, an audio stream network with network components is disclosed. Furthermore, a method for running and/or configuring a network with network components is disclosed.

The audio stream network comprises network components. The audio stream network is preferably a network like a computer network, for example a global network or a local network. The audio stream network has a network topology. The audio stream network comprises a plurality of network components, especially more than three network components, preferably more than ten network components and especially more than fifty network components. The network components comprise at least one source device and at least two receiving devices. Preferably, the source device is also and/or is adapted as a receiving device. Especially, the network components comprise more than two source devices, preferably more than ten source devices and especially more than fifty source devices. Furthermore, the network components comprise preferably more than three receiving devices, especially more than ten receiving devices and in special more than fifty receiving devices. The network components, especially the source devices and/or the receiving devices, are preferably forming the audio stream network.

The network components are connected with network connections. Especially, the source devices are connected with the receiving devices via the network connection. The network connection may be a physical network connection, for example a cable connection, or may be a wireless connection, like a wifi connection. The network connection is adapted for a data exchange between the source device and the receiving device. Preferably, the network connection is an Ethernet network. The network connection is especially using the internet protocol. Preferably the network connection uses the internet protocol version 4 (IPv4) or the internet protocol version 6 (IPv6).

The source device and/or the source devices are adapted to provide an audio stream, whereby the audio stream comprises at least one channel. The source devices are especially Ethernet network enabled devices. For example, the source device is a microphone or a delegate unit. The audio stream may be realized as a compressed data using an audio codec such as mp3, Vorbis or AAC. The audio stream is especially a digital audio stream. The digital stream may contain multiple compressed or uncompressed audio channels.

The receiving devices are adapted to receive one or more audio streams from at least one source device. Preferably, the receiving devices are adapted to receive audio streams from different source devices. Furthermore, the receiving device is for example adapted to receive more than one audio stream from the same source device. The receiving device is preferably an Ethernet network enabled receiving device. The receiving device is for example a computer, a loudspeaker or a delegate unit.

The receiving device receives the audio stream via a stream transmission. The stream transmission is especially a data transfer between the receiving device and the source device, whereby the stream transmission is using the network connection. The stream transmission is transmitted by the network connection. The stream transmission is a multicast transmission or a unicast transmission. Especially, it is possible to choose for a stream transmission if it should be a multicast transmission or a unicast transmission. The unicast transmission is especially using the internet protocol. Furthermore, the unicast transmission is particularly a one-to-one-stream, especially a one-to-one-stream from one source device to one receiving device. The unicast transmission is a transmission, where one audio stream is sent from one device directly to another device. The multicast transmission is a one-to-many-transmission. Particularly, the multicast transmission is a transmission from one source device to at least one, normally at least two, receiving devices. The multicast transmission is particularly a one-to-many-stream, whereby one stream sent by one device but received by multiple devices.

The audio stream network comprises a decision unit. The decision unit is for example a processor unit, a computer unit or a microchip. The decision unit is especially adapted for connection management between the network components. The decision unit comprises a user adjustable rule. Preferably, the decision unit comprises more than one user adjustable rule. The decision unit is adapted to decide whether the stream transmission has to be a multicast transmission or a unicast transmission. Especially, the decision unit is adapted to decide based on the adjustable rule if the stream transmission has to be multicast transmission and/or a unicast transmission. Particularly, the decision unit is adapted to change a multicast transmission into one or many unicast transmission for an audio stream if the rule is met or not met. Especially, the decision unit is adapted to transfer one or many unicast transmission into a multicast transmission if the rule is not met and/or met.

Purpose of the invention is to provide a functional improved audio stream network with network components. Especially, it is purpose of the invention to decide if it is best to use unicast IP or multicast IP for an audio stream. The invention provides an audio stream network for a fast audio streaming with high bandwidth using a network.

In a preferred embodiment of the invention, the decision unit is adapted to detect the number of receiving devices receiving the stream and/or channel provided by one of the source devices as an actual transmission number of the stream and/or channel. The decision unit is adapted to count the number of receiving devices that are receiving a specific audio stream and/or channel provided by one source device. For example, the decision unit is comprised by the source device, whereby the decision unit is detecting the number of receiving devices that are provided with the stream and/or the channel. Alternatively, the decision unit is a central decision unit and adapted to detect the number of devices receiving a specific stream as actual transmission number of the stream. Preferably, the decision unit adapted to detect the actual transmission number before a new connection setup is executed. Alternatively, the decision unit is adapted to detect the actual transmission number cyclically, especially to detect at least once in one minute, preferably once in one second.

Particularly, the decision unit is adapted to decide if the stream transmission has to be a multicast transmission or a unicast transmission based on the actual transmission number of the audio stream and/or channel. Idea of this embodiment is to provide an audio stream network that is able to optimize the stream transmission based on an actual state of the audio stream network.

In a preferred embodiment of the invention the rule comprises a threshold number. The threshold number is for example a number for transmitted channels and/or transmitted audio stream when multicast transmission should be applied. The threshold can for example start from zero, whereby the threshold zero means multicast should never be used. Particularly, the threshold can be set, especially can be set by a user, to any number. Especially, a threshold number of one means that all audio streams will use multicast transmission. Particularly, any number higher than one lead to an automatic conversion of unicast transmission to multicast transmission, whenever the threshold is met. The decision unit is adapted to decide if the stream has to be multicast transmission or unicast transmission by comparing the actual transmission number with the threshold number. For example, as soon as a source device is detecting that the threshold number for a provided channel and/or a provided audio stream is met, this channel and/or audio stream will switch over to multicast transmission, whereby the receiving devices will be instructed to now receive the multicast transmission, whereby the channel and/or audio stream that is/are transferred into a multicast transmission is removed out of all existing unicast transmissions. Advantage of this embodiment is that an audio stream network is provided, that optimizes the audio stream transmission based on a user settable threshold number and the comparison of the actual state of the audio stream network with this threshold number.

In a preferred embodiment of the invention, the decision unit is adapted to transfer one or more unicast transmission in a multicast transmission, if the actual transmission number is larger than the threshold number. For example, the threshold number is set to be two, whereby an audio stream and/or channel provided to one receiving unit is a unicast transmission, and a transmission of an audio stream and/or channel to two receiving devices will be done in a multicast transmission, whereby the unicast transmission is transferred into a multicast transmission when the actual transmission number is equal to and/or bigger than two.

In a further embodiment of the invention, the decision unit is adapted to transfer a multicast transmission into a unicast transmission if the actual transmission number is smaller than the threshold number. For example, the threshold number is set to be two, whereby for example the audio stream and/or is at first provided to two receiving devices and therefore the actual transmission number is two, after a while one receiving device is not receiving the audio stream and/or channel any longer and therefore the actual transmission number is one, whereby when the transmission number is changing from two to one, the multicast transmission is transferred into a unicast transmission by the decision unit. Idea of this invention is to provide an audio stream network that is based on a logical simple rule that is especially error proof.

In a possible embodiment of the invention, the audio stream comprises at least one channel, wherein the decision unit is adapted to use the rule for all channels of a stream. Especially, since the rule holds for individual channels and since an audio stream may carry multiple channels, applying the rule does not automatically mean that a set of complete unicast transmissions is changed over to multicast transmissions. Advantage of this embodiment is to provide an audio stream network that leads to an efficient transmission of individual channels of an audio stream.

In a preferred embodiment of the invention, the decision unit is a central device. The decision unit as a central device is adapted to decide for all streaming and/or participating network components if a stream transmission has to be multicast transmission or a unicast transmission. For example, in case of a centralized decision unit the decision unit is adapted as a central stream management unit and is adapted to control and/or manage the audio streams.

The central decision unit is especially adapted to set up, adapt and/or tear down unicast and/or multicast transmission between network components. The central decision unit may be for example an application with a user interface that allows a human user to manage the stream management or is adapted as a fully automated application. Especially, the centralized decision unit is adapted for a dynamical connection management. The centralized decision unit is preferably adapted for having only the rule set by a human, instead of having a human user indicate whether an individual stream has to use multicast or unicast.

In a further embodiment of the invention, the audio stream network comprises a plurality of decision units as decentral decision devices. Especially, the decentral decision devices are comprised by the source devices, whereby the audio stream network comprises more than one source device. The audio stream network comprises a plurality of decision units, wherein the decision units comprises preferably different rules and/or threshold numbers. Especially, the rules and/or threshold numbers for different decision devices may be changed for every decision unit separately by the human. Especially, in case of a decentralized decision unit, the decision units manage the audio streams.

In a preferred embodiment of the invention, the decision unit is adapted for a dynamic connection management. Especially, the network connection, the network topology and/or the stream transmissions is/are updated at least once per minute, preferably are updated at least once in a second. Especially, the dynamic connection management is done with a time interval, whereby the decision unit is adapted to decide based on the rule, if the stream transmission has to be a multicast transmission or a unicast transmission at least once in this time interval.

Preferably, the decision unit is adapted to tear down, to set up and/or adapt an audio stream and/or a stream transmission. Especially the decision unit is adapted to tear down, set up and/or adapt an audio stream between one source device and one or more receiving devices.

Furthermore, it is preferred that the decision unit is adapted to change a stream transmission from a multicast to a unicast transmission and/or to change a stream transmission from a unicast to a multicast transmission before a previous stream is updated. For example the changeover from a multicast to a unicast transmission or the other way around can be executed before the previous streams are updated so that audio play out at the receiving devices does not have to be disturbed. Furthermore, the audio disturbance in play out can be minimized by optimizing the changeover process, for example by first prepare the source device of the new multicast or unicast stream transmission, then update the receiving devices of the existing stream transmission and move over the receiving device to multicast or unicast and update the source device of the existing stream transmission. Advantage of this embodiment is that the audio disturbance while applying the rule can be minimized.

In a preferred embodiment of the invention, the decision unit is adapted to decide based on the network layout and/or based on the network topology, if the stream transmission has to be a multicast transmission or a unicast transmission. For example, the rule could only hold for a single broadcast domain, especially only if the threshold is met in the broadcast domain the switchover to multicast is executed. This could for example mean, that a transmit channel and/or a transmitted audio stream is streamed using multicast transmission in a particular subnet of the network while it is streamed via unicast transmission to a different subnet of the network. Especially, if the threshold is also met in that second subnet of the network the receiving devices can also move over to receiving the multicast stream transmission used in the first subnet of the network.

Furthermore, in a possible embodiment of the invention, the decision unit is adapted to decide based on resource limitations of a network component, if the stream transmission has to be multicast transmission or a unicast transmission. For example, if a device and/or network component has limitations due to which the rule cannot be applied as is the controller or device can adapt the role to meet the limitations. For example, if a source device can only send out two unicast transmissions and the threshold is configured to four, the device will not be able to reach the threshold, whereby in such a case the decision device can decide to use a threshold of three for that device since that matches its resource limitations.

In a preferred embodiment of the invention, the decision device comprises a sanity unit. The network components comprise a user interface for controlling the sanity unit, especially there is one user interface comprised by the network components. The user interface is adapted for controlling the sanity unit. For example, the user interface is a touch screen or a computer keyboard. The sanity unit is adapted for confirming or rejecting the decision of the decision device by a user interaction. This could for example mean, that the decision unit is performing the threshold check and/or is using the rule, but instead of simply executing the changeover from unicast to multicast transmission or from multicast transmission to unicast transmission it informs the human user that it is intended to execute the changeover. The human user can then for example allow or deny the changeover from unicast to multicast or from multicast to unicast. This could be for example done as an automatic reminder without enforcing the rule automatically, leaving the human user fully in charge.

Furthermore, the invention concerns a method for running and/or configuring a network with network components. Especially the network is an audio stream network. The audio stream network comprises network components, whereby the network components comprise at least one source device and a plurality of receiving devices. The network components are connected with network connections, wherein the network connection is using the internet protocol. Wherein the source devices are adapted to provide an audio stream, wherein the receiving devices are adapted to receive one or more audio streams from at least one of the source devices. The receiving devices receive the audio stream and/or a channel of the audio stream via a stream transmission. The stream transmission is a transmission using the network connection. Especially the stream transmission is a data connection between a source device and at least one receiving device. The stream transmission is a multicast transmission or a unicast transmission. The method is based on deciding whether a stream transmission has to be a multicast transmission or a unicast transmission based on a user adjustable rule.

BRIEF DESCRIPTION OF THE DRAWINGS

Further advantages, features and effects of the invention will become apparent by following the description of preferred embodiments of the invention.

DETAILED DESCRIPTION

Figure 1:
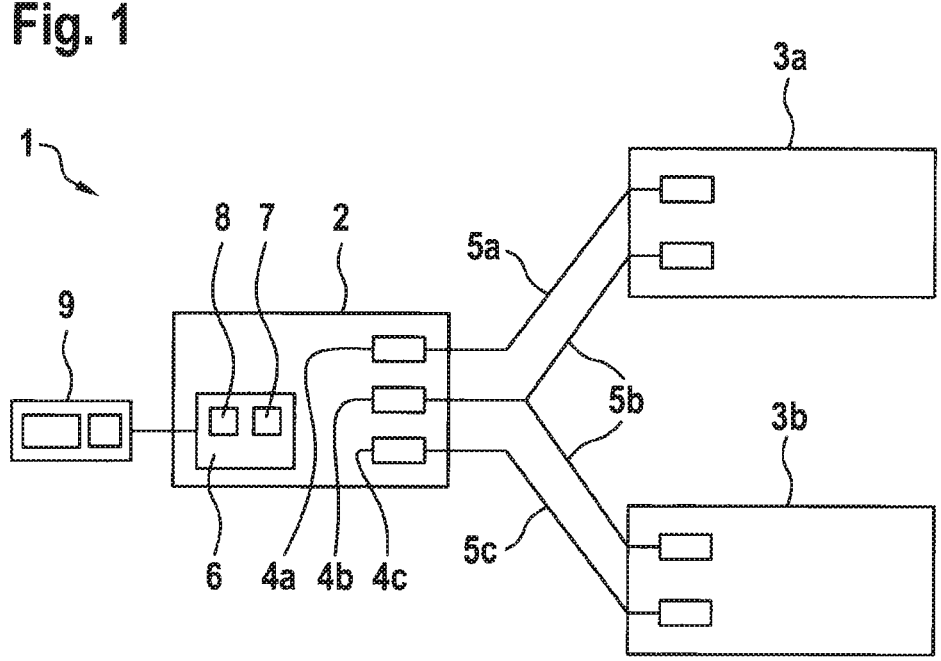
FIG. 1 shows schematically an audio stream network.

FIG. 1 shows an audio stream network 1. The audio stream network comprises network components. The network components comprise one source device 2 and two receiving devices 3a and 3b. The source device 2 is for example a microphone or an mp3-unit. The receiving devices 3a, 3b are for example loudspeakers or delegate units with headphones. The network components, especially the source device 2, are connected with the receiving devices 3a via a network connection. The network connection is for example a cable connection, alternatively the network connection is a Wi-Fi connection or a Bluetooth connection. The source device 2 is adapted to provide audio streams 4a, 4b and 4c to the receiving devices 3a and 3b. The audio streams carry a single channel or multiple channels. Especially, the source device is adapted to provide the audio streams 4a, 4b and 4c via stream transmissions 5a, 5b and 5c.

The transmission of an audio stream 4a, 4b and 4c from the source device 2 to one receiving device 3a or 3b directly is done by a unicast transmission 5a or 5c. A unicast transmission 5a and 5c is for example a device-to-device transmission especially from one device to exactly one receiving device 3a or 3b. For example, the audio stream 4a is transmitted using the unicast transmission 5a to the receiving device 3a, whereby the audio stream 4c is transmitted using also a unicast transmission 5c to the receiving device 3b. The audio stream 4b is transmitted from the source device 2 to the receiving device 3a and to receiving device 3b. This transmission is done by a multicast transmission 5b, whereby the multicast transmission is a transmission from one source device 2 to two receiving devices 3a and 3b.

The source device 2 comprises a decision unit 6. The decision unit 6 is for example a microcontroller or a processor unit inside the source device 2. The decision unit 6 is adapted to count and/or detect the number of receiving devices that are provided with an audio stream 4a, 4b or 4c. and/or are provided with an channel Especially, the decision unit 6 is adapted to detect for every audio stream 4a, 4b and 4c and/or for every channel separately the number of receiving devices that are receiving this audio stream and/or this channel. This detected number is provided by the detection unit 6 as actual transmission number 7 of the stream and/or the channel. The decision unit 6 comprises a threshold number 8. The threshold number 8 is especially user adjustable. Therefore, the audio network 1 comprises a user interface 9, whereby the user interface is comprised and/or connected, especially data technical connected, with the source device 2. Via the user interface 9, a human user can adapt and/or change the threshold number 8. The decision unit 6 is adapted to compare the actual transmission number 7 with the threshold number, whereby based on this comparison the decision unit is adapted to decide if a stream transmission 5a, 5b or 5c has to be a unicast transmission or a multicast transmission. Especially, the detection unit 6 is adapted, whenever the actual transmission number 7 of any stream and/or channels changing to decide if a unicast transmission has to be changed in a multicast transmission or if a multicast transmission has to be changed in a unicast transmission.

Figure 2:
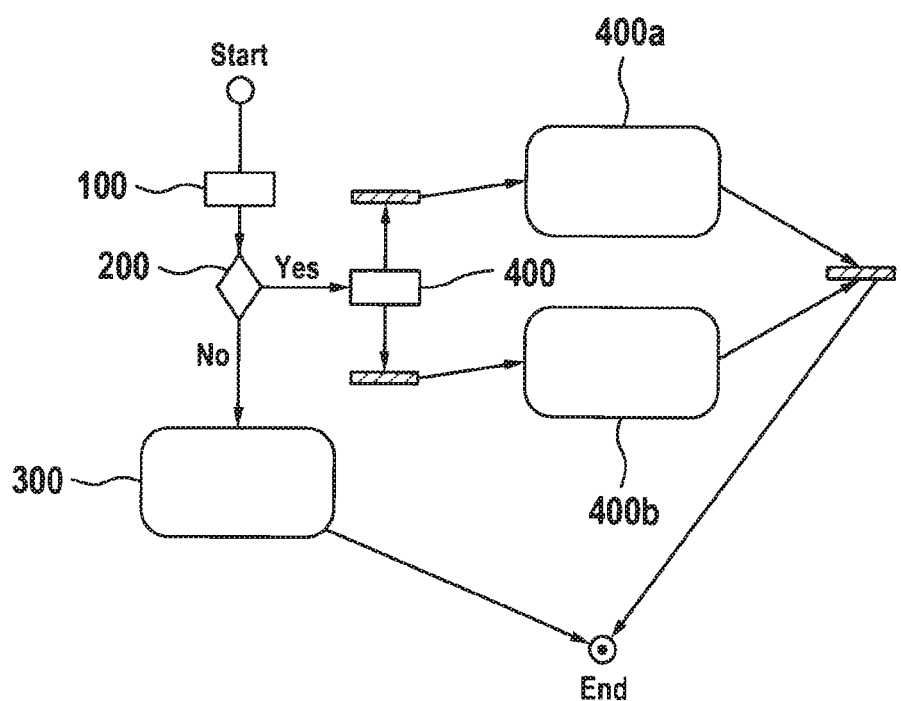
FIG. 2 shows a first decision tree.

FIG. 2 shows a decision tree for the decision made by a decision unit 6. In this decision tree in a step 100 the receiving device 3a wants to connect to a source device 2 and to stream the audio stream 4a. The decision unit 6 is in a step 200 counting the number of receiving devices that are connected to the audio stream 4a of the source device 2. This number is the actual transmission number 7. The decision unit 6 is checking in this step 200 if the threshold number 8 is met by the actual transmission number 7. In the case that the threshold 8 number is not met, in the step 300 the source device 2 is connected with the receiving device 3a via a unicast stream and the audio stream 4a is transferred via this unicast stream 5a.

In other words at start there is no transmission yet between the source device 2 and receiving device 3a. In step 100 the transmission number 7 is determined which relates to the current number of connections not yet counting the new one. In step 200 the transmission number 7 is then incremented with 1 (i.e. the pending connection request of 2 to 3a) and this is compared to the threshold number 8.

In the case that in the step 200 it is detected that the threshold number 8 is met by the actual transmission number 7 plus 1, the detection unit 6 is executing the step 400. Step 400 comprises two substeps 400a and 400b. In the substep 400a a multicast transmission 5b is created, whereby this multicast transmission 5b contains the audio stream 4b. The receiving device 3a is instructed to receive this multicast transmission 5b. Furthermore all receiving devices that are receiving the audio stream 4a, are connected with the multicast transmission 5b. In the substep 400b all unicast streams 5a,5c that are containing the audio stream 4a, are updated, if audio 4c contains the same channel as stream 4a, whereby unicast streams containing the audio stream 4a, are deleted.

Figure 3:
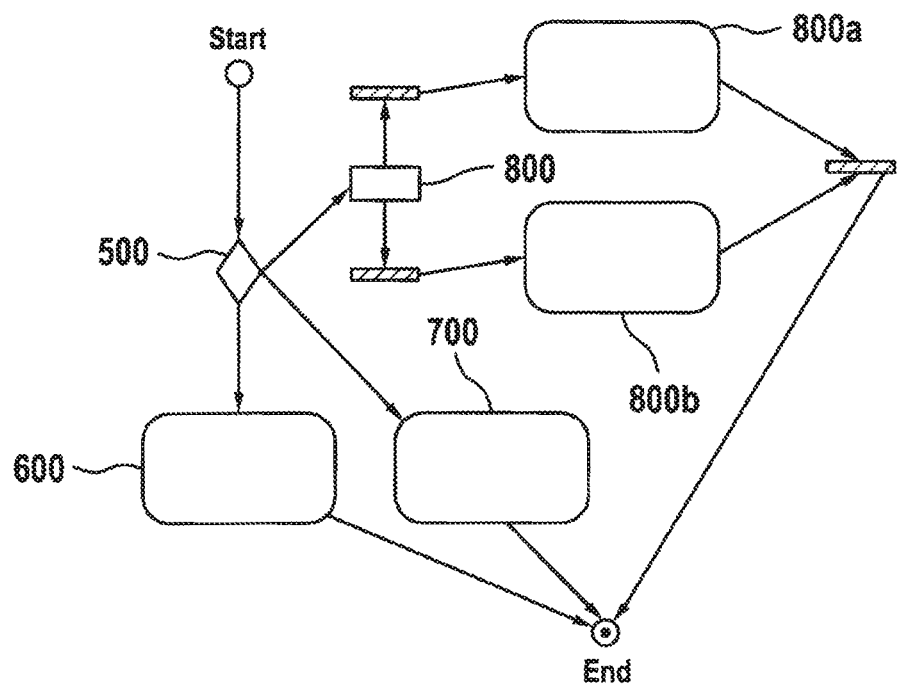
FIG. 3 shows a second decision tree.

FIG. 3 shows also a decision tree for the execution of the rule by the decision unit 6. This decision tree shows the act that an audio stream 4b of a receiving device is unlinked. Especially, the decision tree runs before the unlinking is actually performed, so the calculation is done on actual transmission number−1, since one receiver will be removed. At first the audio stream 4a from the receiving device 3a is unlinked from the source device 2. In a step 500 the decision unit 6 is counting how many receiving devices are still linked to the channel after unlinking the receiving device 3a from the audio channel and/or audio stream. Also in the step 500 it is checked, if the number of remaining linked receiving devices to the audio stream 4a is larger, equal or smaller than the threshold number 8. If the number of remaining connected receiving device 3a is smaller than the threshold number 8 minus one, in a step 600 the receiving device 3a is removed from the unicast transmission 5a.

In the case that the number of remaining connected devices is larger or equal than the threshold number 8, in a step 700 the receiving device 3a is instructed to stop receiving the multicast stream 5b that is transferring the stream 4b from source device.

In the case that the number of remaining connected receiving devices is exactly the threshold number 8 minus one, then a step 800 is executed. The step 800 contains two substeps 800a and 800b. In the substep 800a a unicast stream 4a, 4c is created, whereby the unicast stream contains the audio stream 4a. The remaining receiving devices 3a, 3b are connected to the unicast transmission, if they receive the audio stream 4b. In the substep 800b all multicast transmissions containing the audio stream 4b are updated, whereby the multicast stream 5b containing the audio stream 4a is removed.

After executing the step 600, 700 and/or 800, the rule is executed by the decision unit 6 and ends. After the end the rule can be executed again, whereby then the rule starts again at the starting point.

Figure 4:
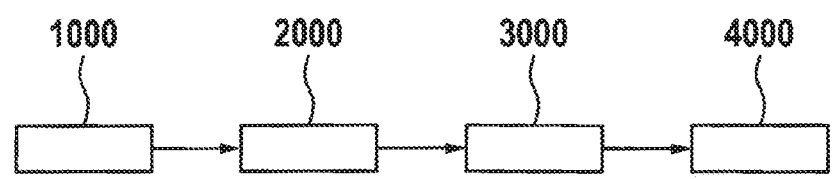
FIG. 4 shows a process diagram.

FIG. 4 shows an example for a process diagram. This process diagram assumes that the audio stream 4 always carries four channels, whereby the audio stream 4 may carry empty channels. Furthermore, it assumes that the connections are managed on a per-channel bases by linking them together, i.e. linking a receiving channel to a source channel. In this example the threshold number 8 is set to three. Furthermore, this example assumes that the audio stream network 1 consists of four network components and a central decision unit 6. Furthermore, this example assumes that the switchover from unicast transmission 5a, 5c to multicast transmission 5b must be performed automatically.

In a first step 1000 in a human user action the receiving channel A of the receiving device 3a is linked to the source channel A of the source device 2. The decision unit 6 set up a unicast transmission 5a between the source device 2 and the receiving device 3a. Further the decision unit 6 puts the source channel A of the source device 2 into stream 4a that is transmitted via unicast transmission 5a. The end result is that there is a unicast transmission 5a between the source device 2 and the receiving device 3a carrying the channel A of source device 2.

In the step 2000 a human user action is to link the receiving channel B of the receiving device 3a to the source channel B of the source device 2. The decision unit 6 will execute the following steps: update the existing stream 4a, add source channel B of the source device 2 to the stream. Since unicast transmission 5a between source device 2 and receive device 3a carrying stream 4a is still in place nothing has to change in the transmission. The end result of this step 2000 is that there is a unicast transmission 5a between the source device 2 and the receiving device 3a carrying stream 4a that contains the channel A and B of the source device 2.

In a step 3000 the human user action is to link the receive channel A of receiving device 3b to the source channel A of the source device 2. The decision unit 6 will execute the steps: set up a unicast transmission 5b between source devices 2 and receiving device 3b, put source channel A of the source device 2 into stream 4b that is transmitted via unicast transmission 5b. The end result of this step 3000 is that there is a unicast transmission 5a between the source device 2 and the receiving device 3a carrying channel A and B of the source device 2 and that there is an unicast transmission 5b between the source device 2 and the receiving device 3b carrying the channel A of the source device 2.

In a step 4000 the human user action is to link receive channel A of the receiving device 3c to the source channel A of the source device 2. The decision unit 6 will execute the following steps: detect that the threshold number 8 is met for the source channel A of the source device 2, update the existing unicast stream 4a from the source device 2 to the receiving device 3a, remove source channel A from it. Delete the unicast transmission 5b from the source device 2 to the receiving device 3b (and delete stream 4b as well). Create a multicast transmission 5b from the source device 2 to the receiving devices 3a, 3b and 3c, put source channel A of source device 2 into the multicast stream 4b and have receive channel A of receiving device 3a, receive channel A of receiving device 3b and receive channel A of receiving device 3c receive channel A out of the multicast transmission. The end result of this step 4000 is that there is a unicast stream 5a between the source device 2 and the receiving unit 3a carrying channel B of the source device 2. Furthermore, there is a multicast transmission 5b between the source device 2 and the receiving device 3a, 3b and 3c carrying the channel A of the source device 2.

The invention claimed is:

1. An audio stream network comprising a plurality of network components,
    wherein the network components comprise at least one source device and a plurality of receiving devices,
    wherein the network components are connected with a network connection, wherein the network connection uses an internet protocol,
    wherein the source device is configured to provide an audio stream,
    wherein the audio stream comprises at least one channel,
    wherein the receiving devices are configured to receive one or more audio stream from at least one of the source devices,
    wherein the receiving device receives the audio stream via a stream transmission, wherein the stream transmission is transmitted by the network connection, wherein the stream transmission is a multicast transmission or a unicast transmission,
    the audio stream network further comprising a decision unit, wherein the decision unit comprises a user adjustable rule and is configured to decide whether the stream transmission has to be a multicast transmission or a unicast transmission,
    when the decision unit decides to switch over the stream transmission, the decision unit instructs the receiving devices to now receive the stream transmission that is another of a multicast transmission and an unicast transmission, and when the channel and/or the audio stream is/are transferred into a multicast transmission, the channel and/or the audio stream is removed out of all existing unicast transmissions, and when the channel and/or the audio stream is/are transferred into unicast transmissions, the audio stream and/or the channel is removed out of the multicast transmission, and wherein the decision unit comprises a sanity unit, wherein at least one of the network components includes a user interface for controlling the sanity unit, wherein the sanity unit is configured for confirming and/or rejecting the decision of the decision unit by an user interaction.

2. The audio stream network as in claim 1, wherein the decision unit is configured to detect a number of receiving devices receiving the audio stream and/or the channel provided by one of the source devices as an actual transmission number of the audio stream.

3. The audio stream network as in claim 2, wherein the rule comprises a threshold number, wherein the decision unit is configured to decide if the audio stream has to be multicast transmission or an unicast transmission by comparing the actual transmission number with the threshold number.

4. The audio stream network as in claim 3, wherein the decision unit is configured to transfer an unicast transmission to a multicast transmission, if the actual transmission number is equal to and/or larger than the threshold number.

5. The audio stream network as in claim 3, wherein the decision unit is configured to transfer a multicast transmission to an unicast transmission, if the actual transmission number is smaller than the threshold number.

6. The audio stream network as in claim 3, wherein the decision unit is configured to use the rule for all channels of the audio stream.

7. The audio stream network as in claim 1, wherein the decision unit is a central device and configured to decide for all streaming and/or participating network components if stream transmissions have to be a multicast transmission or an unicast transmission.

8. The audio stream network as in claim 1, wherein the audio stream network includes a plurality of decision units as decentral decision units, wherein the decision units include different rules, different threshold numbers, or both.

9. The audio stream network as in claim 3, wherein the decision unit is configured for a dynamic connection management.

10. The audio stream network as in claim 3, wherein the decision unit is configured to tear down, set up and/or adapt an audio stream and/or an stream transmission.

11. The audio stream network as in claim 1, wherein the decision unit is configured to change a stream transmission from multicast transmission to unicast transmission, or from unicast transmission to multicast transmission before a previous audio stream is updated.

12. The audio stream network as in claim 1, wherein the stream transmission is streamed using multicast transmission to a particular subnet of the network while being streamed via unicast transmission to a different subnet of the network.

13. The audio stream network as in claim 3, wherein the decision unit is configured to decide based on a resource limitation of a network component if the stream transmission has to be a multicast transmission or an unicast transmission.

14. A method for running and/or configuring a network with network components, wherein the network components comprise at least one source device and a plurality of receiving devices, wherein the network components are connected with a network connection,
configuring the receiving devices to receive one or more audio streams from at least one source device,
receiving with the receiving device the audio stream via the network connection, wherein the stream transmission is a multicast transmission or a unicast transmission,
deciding based on an user adjustable rule whether the stream transmission has to be a multicast transmission or an unicast transmission,
when a decision unit decides to switch over the stream transmission, the decision unit instructs the receiving devices to now receive the stream transmission that is another of a multicast transmission and an unicast transmission, and when the channel and/or the audio stream is/are transferred into a multicast transmission, the channel and/or the audio stream is removed out of all existing unicast transmissions, and when the channel and/or the audio stream is/are transferred into unicast transmissions, the audio stream and/or the channel is removed out of the multicast transmission, and
wherein the decision unit comprises a sanity unit, wherein at least one of the network components includes a user interface for controlling the sanity unit, wherein the sanity unit is configured for confirming and/or rejecting the decision of the decision unit by an user interaction.

15. The method according to claim 14, wherein the deciding based on an user adjustable rule whether the stream transmission has to be a multicast transmission or an unicast transmission includes deciding based on a network layout and/or a network topography whether the stream transmission has to be a multicast transmission or an unicast transmission.

16. The method according to claim 15, including streaming the stream transmission using multicast transmission to a particular subnet of the network while streaming via unicast transmission to a different subnet of the network.

17. The audio stream network according to claim 1, wherein the decision unit is a microcontroller or a processor unit inside the source device.

18. An audio stream network comprising a plurality of network components,
wherein the network components comprise at least one source device adapted to provide an audio stream and a plurality of receiving devices,
wherein the network components are connected with a network connection, wherein the network connection uses an internet protocol,
wherein the audio stream comprises at least one channel,
wherein the receiving devices are adapted to receive one or more audio stream from the at least one source device,
wherein the receiving device receives the audio stream via a stream transmission, wherein the stream transmission is transmitted by the network connection, wherein the stream transmission is a multicast transmission or a unicast transmission,
the audio stream network further comprising a decision unit, wherein the decision unit comprises a user adjustable rule that comprises a threshold number, and the decision unit is configured to decide whether the stream transmission has to be a multicast transmission or a unicast transmission by comparing an actual transmission number of the receiving devices receiving the audio stream with the threshold number,
when the decision unit decides to switch over the stream transmission, the decision unit instructs the receiving devices to now receive the stream transmission that is another of a multicast transmission and an unicast transmission, and when the channel and/or the audio stream is/are transferred into a multicast transmission, the channel and/or the audio stream is removed out of all existing unicast transmissions, and when the channel and/or the audio stream is/are transferred into unicast transmissions, the audio stream and/or the channel is removed out of the multicast transmission, and
wherein the decision unit comprises a sanity unit, wherein at least one of the network components includes a user interface for controlling the sanity unit, wherein the sanity unit is configured for confirming and/or rejecting the decision of the decision unit by an user interaction.

* * * * *